United States Patent [19]

Davis

[11] Patent Number: 5,030,290

[45] Date of Patent: Jul. 9, 1991

[54] PAINT STRIPPING COMPOSITIONS AND METHOD OF USING SAME

[75] Inventor: Elbert Davis, 30781 S. Coast Hwy., Villa 91, Laguna Beach, Calif. 92651

[73] Assignees: Elbert Davis, Laguna Beach, Calif.

[21] Appl. No.: 291,721

[22] Filed: Dec. 29, 1988

[51] Int. Cl.$^5$ .............................................. B08B 7/00
[52] U.S. Cl. ........................................ 134/4; 134/4; 134/38; 134/41; 134/42; 427/154; 427/156; 427/309; 252/170; 252/171; 252/174.23; 252/542; 524/104; 524/557
[58] Field of Search ..................... 134/4, 38, 41, 42; 427/154, 156, 309; 252/170, 171, 174.23, 542; 524/104, 557

[56] References Cited

U.S. PATENT DOCUMENTS

| | | | |
|---|---|---|---|
| 2,435,239 | 2/1948 | Schub | 134/38 |
| 3,355,385 | 11/1967 | Mackley | 134/38 |
| 3,762,953 | 10/1973 | Clarke, Jr. et al. | 252/170 |
| 4,428,871 | 1/1984 | Ward et al. | 252/170 |
| 4,780,235 | 10/1988 | Jackson | 252/171 |
| 4,812,255 | 3/1989 | Suwala | 134/38 |
| 4,900,364 | 2/1990 | Diedrich | 134/38 |
| 4,927,556 | 5/1990 | Pokorny | 252/170 |

*Primary Examiner*—Theodore Morris
*Assistant Examiner*—Zeinab El-Arini
*Attorney, Agent, or Firm*—Nilsson, Robbins, Dalgarn, Berliner, Carson & Wurst; Nilsson, Robbins, Dalgarn, Berliner, Carson & Wurst

[57] ABSTRACT

Paint stripping compositions and a method of removing paint and the like from a substrate is disclosed. More particularly, a stripping composition comprised of a polymeric resin, a water insoluble organic plasticizer, and a water miscible organic solvent, is provided for use in penetrating, softening, loosening and lifting the paint from a painted substrate while laminating with the paint. The lamination process is expedited by inclusion of steam heat and removal of the resultant laminate is accomplished by peeling, or more preferred, by blasting with pressurized steam or water.

41 Claims, No Drawings

5,030,290

PAINT STRIPPING COMPOSITIONS AND METHOD OF USING SAME

FIELD OF THE INVENTION

This invention relates to stripping compositions and to a method of removing paint and the like from a substrate. More particularly, this invention relates to a stripping composition capable of penetrating, softening, loosening and lifting the paint from the substrate while laminating with the paint on the substrate thereby permitting easy removal of the resultant laminate by peeling or blasting with pressurized water or steam.

BACKGROUND OF THE INVENTION

For a variety of reasons ranging from the aesthetic attributes to the protection of structural material, it is common practice to paint or coat a vast range of materials. Likewise it is often desirable to remove such paint or coatings from the substrate. Various methods of removing such paint and coatings have been employed, from scraping to chemicals to blasting the substrate with minute particles such as sand. However, each known method of removing such paint and coatings from the various substrates has distinct disadvantages.

More specifically, today's technology is replete with chemical compositions which can strip or facilitate the stripping of coatings such as paint, lacquer, varnish, shellac, polyurethane finishes, enamels, and the many other coatings used to protect and to beautify the substrates. The most popular types of strippers use an organic chemical solvent base. Even more typically, the compositions contain chlorinated hydrocarbons and/or phenolic compounds or other highly caustic and corrosive materials capable of removing paint and the like from a variety of substrates. Often these components are relatively toxic and subject to stringent use requirements, including hazardous chemical handling procedures such as the use of special clothing and gloves enabling the user to avoid contact with the stripping composition.

Additionally, because of the toxicity of certain components of the stripping composition, environmental safety precautions often require that the materials be disposed of as hazardous waste. Additionally, many such compositions are highly volatile and subject to special safety precautions during use to prevent combustion.

A specific use for which this invention is applicable, relates to the removal of paint from aircraft. Historically, paint has been removed from aircraft for inspection, maintenance, and repair purposes by using alkali solutions and solvent paint strippers. In connection with governmental efforts to prevent possible damage to the environment, recent regulations have made it increasingly difficult to dispose of the residues formed when using known paint strippers. Various other chemical compositions have been tested and rejected for reasons such as difficulty in applying the composition to the substrate, necessity for repeated applications of the composition to remove the paint from the substrate, excessive waiting times for the composition to soften the paint prior to removal from the substrate, and difficulty in removing the softened paint and the like from the substrate. Alternative paint removal methods such as sandblasting have been evaluated for removing the paint and producing only a dry waste which can be disposed of safely. However, the sand causes damage to the aluminum or composite substrate during the removal process.

Therefore, it is desirable to provide an easier, quicker and more effective composition and procedure for removing paint and the like from airplanes as well as other substrates.

It is another feature of the present invention to provide a stripping composition that is generally compatible to the environment and has minimal toxicological problems with regard to human use and contact.

It is yet another feature of the present invention to provide a stripping composition which can penetrate, soften, swell and lift paint and the like from a substrate within a short period of time, i.e. generally within 24 hours.

It is still another feature of the present invention to provide a water miscible stripping composition capable of penetrating, softening, swelling and lifting paint and the like from a substrate and which is easily removable from the substrate with the application of high pressure water or steam.

It is yet another feature of the present invention to provide a stripping composition which while penetrating, softening, swelling and lifting paint and the like from a substrate, laminates with such paint permitting the resultant laminate to be easily stripped from the substrate.

It is yet another feature of the present invention to provide a stripping composition and method of removing paint and the like from a substrate which results in a solid waste of composition and paint which is environmentally safe for disposal purposes.

It is yet another feature of the present invention to provide a stripping composition which can be readily and effectively applied to a painted substrate while such substrate is in a vertical or other non-horizontal position.

SUMMARY OF THE INVENTION

A stripping composition for removing paint and the like from a substrate, which composition is capable of penetrating, softening, swelling, lifting and forming a laminate with such paint and a method of removing paint and the like from a substrate using such a stripping composition are disclosed. Generally, an elastomeric plastic polymer is dissolved in a high boiling point solvent solution and applied to a painted substrate, allowed to cure with the paint and removed by peeling or blasting with high pressure steam or water.

More specifically, the stripping composition is comprised of (1) a high molecular weight polymeric resin such as polyvinyl formal resin, (2) a plasticizer such as octyl phenoxy ethanol, diethyl phthalate, or a dibasic ester selected from the group consisting of dimethyl succinate, dimethyl glutarate, dimethyl adipate, and mixtures thereof, and (3) a solvent which preferably is nontoxic or having limited toxicity, such as N-methyl pyrrolidone. The stripping composition may include one or more thixotropic additives such as colloidal silica, for the purpose of thickening the composition and permitting the use thereof on substrates which are non-horizontally positioned. A pigmentation additive such as titanium dioxide may also be added to the stripping composition to facilitate visual evaluation of thickness of the composition when applied to a substrate.

The stripping composition penetrates, softens, swells and lifts the paint from the substrate. Dependent upon the formulation of the composition, the residue may either be a soft coating or the composition may be permitted to laminate with the paint. In a softened condition, the residual paint-composition mixture may be removed by rubbing, sanding, light media blasting and the like. If allowed to form a laminate, the resultant stripping composition/paint laminate may be peeled from the substrate or removed by pressurized steam or water. In each case, the paint/composition residue may be disposed of as a solid waste which more readily complies with the requirements of the environmental regulations.

In the preferred embodiment, the stripping composition is comprised of N-methyl pyrrolidone, polyvinyl formal resin, a dibasic ester or dibasic ester mixture acting as a plasticizer, a thixotropic additive and optionally a pigmentation additive, which composition is applied to the painted substrate. Heat is applied to the coated substrate in the form of hot air or steam. The applied heat accelerates the stripping reaction resulting in a paint/composition laminate. The laminate may be peeled from the substrate or pressurized steam or hot water may be used to remove the laminate from the substrate.

DESCRIPTION OF THE PREFERRED EMBODIMENT

The stripping compositions of the present invention are useful in removing paint and the like from various substrates. The stripping composition is a mixture of 5-40% by weight of a high molecular weight polymeric resin which has a solubility parameter ($\delta$) from about 8.5 to about 12.5, 2-20% by weight of a water insoluble organic plasticizer which plasticizes the resin to a flexible solid; with the plasticizer having a boiling point above 200°C and a solubility parameter ($\delta$) from about 8.5 to about 12.5; and 40-90% by weight of a water miscible organic solvent having a boiling point between 150°C and 300°C and a solubility parameter from about 8.5 to about 12.50. The stripping composition may optionally include a thixotropic additive which will thicken the composition and permit its use on substrates positioned otherwise than horizontally. Additionally, a pigmentation additive may be added to enable the user to determine the thickness of the stripping composition when applied to the substrate.

Solubility parameters, as used herein, are theoretically calculated numerical constants which are a useful tool in predicting the ability of a solvent to dissolve a particular resin or polymer. Most resins and polymers are amorphous mixtures comprised of a variety of molecular weights and polar groups and whose solubility parameters can be determined experimentally. Solvents, on the other hand, generally have a wide solubility parameter range. Hence, when the solubility parameter of a solvent falls within the solubility parameter range of the resin, solution is likely to occur. Numerous multi-component systems have been developed over the years to expand upon Hildebrand and Scott's initial concept of a single solubility parameter ($\delta$) since two or three related solubility parameters are required to successfully apply the concept to polar solvents. In the experimental data which follows, the solubility parameter system developed by Charles Hansen has been used. The Hansen system defines solubility parameters and relates them to Hildebrand's total or overall parameter using the equation $\delta^2 = \delta_D^2 = \delta_P^2 = \delta_H^2$, where $\delta_D$ is the dispersive or "nonpolar" parameter; $\delta_P$ is the polar parameter; and $\delta_H$ is the hydrogen parameter. The component parameters can be developed in various ways, but it should be noted that since the numeric values for the solubility parameters and their interpretation vary significantly between different solubility parameter systems, it is important that only consistent values from one parameter system be used when comparing solvents.

Such components solubility parameters may then be plotted in a normal three-dimensional graph. Components parameters for polymers may also be assigned and plotted in the three-dimensional space. A coherent value (or envelope) of solubility is found to exist in this space such that any solvent whose parameters reside within this space should dissolve the polymer in question.

Turning now to Table 1, the high molecular weight, polymeric resin predominantly used in the following examples is a Monsanto Plastics & Resins Co. polyvinyl formal resin, sold under the trademark FORMVAR (trademark) E resin, which is made up of varying molecular proportions of polyvinyl acetal, polyvinyl alcohol and polyvinyl acetate. For specific formulation information Monsanto has a numerical designation following the trademark, such as 12/85 or 15/95 which is used to indicate the viscosity of the polyvinyl acetate from which the product was made and the extent to which acetate groups have been removed by hydrolysis. For example, FORMVAR (trademark) E 12/85 is made from a polyvinyl acetate having a viscosity of 12.0 cps (viscosity of a benzene solution containing 86 grams of polyvinyl acetate per 1000 ml of solution, measured at 20°C). Approximately 85 percent of the acetate groups have been replaced with alcohol and formal groups.

In all the examples found in this Table 1, the stripping compositions were applied to a painted substrate.

TABLE 1

| Component | Example (In parts by Weight of Composition) | | | | | | | | | |
|---|---|---|---|---|---|---|---|---|---|---|
| | A | B | C | D | E | F | G | H | I | J |
| Polyvinyl formal resin (FORMVAR E 15/95)[1] | 20 | 20 | 20 | 5 | 24 | 20 | 120 | 24 | | 120 |
| Polyurethane (GOODRICH ESTANE 5703P)[2] | | | | | | | | | 24 | |
| Sulfonamide (SANTICIZER 8) | 4 | | | | | | | | | |
| Dibasic ester mixture[3] | | 4 | | | 100 | 4 | 500 | 12 | 12 | 60 |
| Diethyl phthalate | | | 4 | | | | | | | |
| Octylphenoxyethanol (TRITON X-100)[4] | | | | 10 | | | | | | |
| Dimethyl formamide | 100 | 100 | | | | | | | | |
| N-methyl-2-pyrrolidone (M-PYROL)[5] | | | 100 | 100 | 20 | 100 | 100 | 100 | 100 | 330 |
| Butyrolactone | | | | | | | | | | 165 |
| Colloidal silica | | 5 | 5 | 12 | 6 | 6 | 30 | 6 | | |

TABLE 1-continued

| Component | Example (In parts by Weight of Composition) | | | | | | | | | |
|---|---|---|---|---|---|---|---|---|---|---|
| | A | B | C | D | E | F | G | H | I | J |
| Titanium dioxide | | 3 | 3 | 2 | | 3 | | 2.4 | | |

[1] A trademarked product of Monsanto Company
[2] A product of B. F. Goodrich Company
[3] Dimethyl succinate (23 wt %), dimethyl glutarate (56 wt %), dimethyl adipate (21 wt %). This mixture is available as DBE from E. I. Dupont de Nemours & Company, Inc.
[4] A trademarked product of Rohm and Haas Company
[5] A trademarked product of GAF Company The substrate in all cases was aluminum. The aluminum substrate was coated with various types of polyurethane and epoxy based paints. It was also found that the stripping compositions were effective on oil-based and alkyd based paints.

Turning first to Example A, a stripping composition mixture of polyvinyl formal resin, dimethyl formamide and a sulfonamide plasticize (for example, SANTICIZER 8, a trademarked produce of Monsanto) was subjected to high sheer dispersion to bring the composition to a homogenous solution. The homogeneous stripping composition was applied to the painted substrate and observed for a period of twenty-four hours. During this 24 hour period, the stripping composition produced a polymer film laminate with the paint which progressively hardened as to become strippable from the substrate. With additional time the laminate continued to harden becoming easier to strip from the substrate. When the stripping composition/paint laminate was removed from the substrate, the resultant surface of the substrate evidenced a slight film of surplus exuded dimethyl formamide solvent, but was generally clean of paint. The solvent, being water soluble, was easily rinsed with water from the surface of the substrate. The resultant relatively dry tough laminate formed by the paint and the stripping composition was easily disposable as solid waste without environmental contamination.

The weight percentage components of the mixture can be varied as desired. The use of a lower weight percentage of polymer resin results in a corresponding decrease in viscosity of the stripping composition and hence would provide for easier sprayability. Likewise, by increasing the weight percent of polymer resin in the solvent, a corresponding increase in viscosity is attained. For example, increasing the weight percent of polymer resin to 30% results in a stripping composition which is paste-like and exhibits less run or sag when applied to vertical surfaces.

The amount and type of plasticizer used dictates the flexibility and toughness of the strippable polymer film formed by the polymer resin when cured. Use of 20% by weight of plasticizer based on the polymer content results in a flexible, tough, strippable polymer film. When the plasticizer content is reduced to 10% of the polymer content, a harder, tougher, strippable film is obtained. An increase of plasticizer to 50% by weight of polymer content could be chosen if a very soft film were desired or if the stripper composition is to be applied and quickly scraped from the surface and disposed of as a paste-like residue rather than allowed to dry and laminate with the paint.

In Example B, a dibasic ester mixture plasticizer is substituted for the sulfonamide plasticizer. This dibasic ester mixture would normally not be considered as a plasticizer because of the high volatility each of these esters normally exhibits. The result being that the dibasic ester plasticizers would quickly disappear from the stripping composition. However, a generally permanent plasticizer is not required in this particular application because the plasticizer is required to flexibilize the polymer film only through the period within which it is removed from the substrate, normally within 24 hours. Since the dibasic esters are excellent paint softeners it would be expected that the volatile esters would remain with the softened paint as a sticky paste requiring removal by scraping the surface of the substrate. However, in acting as temporary plasticizers for the polyvinyl formal resin, the dibasic esters, after acting efficiently as paint softeners, are removed from the substrate as part of a reaction with the resin during the lamination process.

Example B also illustrates the addition of a pigmentation additive, titanium dioxide, for the purpose of providing a convenient visual means to monitor the thickness of the stripper composition as applied. Additionally, a thixotropic additive, colloidal silica, is included in the stripping composition to keep the slow drying formulation from running and sagging after application on non-horizontal surfaces.

Example C illustrates the use of a less toxic solvent, N-methyl pyrrolidone as a substitute for the dimethyl formamide. N-methyl pyrrolidone is considered non-toxic, is not a skin irritant, is not mutagenic and is completely biodegradable. Additionally, N-methyl pyrrolidone has a relatively high boiling point. The plasticizer used in this example was diethyl phthalate. These characteristics make N-methyl pyrrolidone the preferred solvent for the stripping compositions of the present invention. Even so, use of N-methyl pyrrolidone as the solvent portion of the stripping composition produces the disadvantage of creating a very slow-to-dry strippable film.

It was found that N-methyl pyrrolidone could be extracted from the stripping composition by the application of heat, thus the "drying" phase of the stripping process could be expedited. Use of a hot air gun to accomplish this drying phase was successful. The heat caused the solvent to penetrate and solvate the paint immediately and the dried, wrinkled polymer and stripping composition/paint laminate could be stripped from the substrate much sooner than without the heat.

The application of steam heat proved even more effective with the steam extracting the water soluble solvent from the stripping composition, effectively "drying" the formulation. Additionally, the heat from the steam application increased penetration and solvation of the paint resulting in immediate formation of the stripping composition/paint laminate, which has wrinkled and lifted from the substrate enabling the laminate to be stripped away as solid disposable trash.

It was also found that after the steam had successfully "dried" the formulation, pressure could be added so that the now pressurized steam can lift the laminate and blow it off the substrate, eliminating the need to physically strip the laminate from the surface of the substrate. Further, the thin film of surplus exuded water soluble solvent on the substrate surface could be effectively rinsed and washed from the surface by the continued application of pressurized steam. The result was a substrate that was clean of both paint and stripping composition.

In Example D, the amount of thixotropic additive was increased so as to permit formation of a paste. Additionally, a biodegradable surfactant, octylphenoxyethanol, was utilized as the plasticizer. This further enhanced the water removability of the paste and the laminate formed by the paint and stripping composition. A pigmentation additive was included to permit the user to monitor the thickness of stripping composition applied to the substrate.

In Example E, the amount of plasticizer was increased and the amount of solvent reduced. The composition of Example E reduces the cost of the formula but still retains the advantage of low toxicity. The resulting composition has a high viscosity, being essentially paste-like, and allows the removal of the paint by a slightly different mechanism. In this case the paint is slowly dissolved (requiring from about 24 to about 48 hours) and is absorbed by the polymer to form a gum which then can be rolled up into a soft mass and removed from the substrate.

Example F is in general similar to Example C, excepting that the dibasic ester mixture is used as the plasticizer instead of diethyl phthalate. Again, because of the use of n-methyl pyrrolidone, the stripping composition exhibited slow drying characteristics which were overcome by the separate use of (1) a hot air gun and (2) steam heat.

In Example G the amount of plasticizer and polyvinyl formal resin were greatly increased. The result was that the very high percentage of non-drying plasticizer prevented the polyvinyl formal resin from drying to a tough strippable film. After application of the paste-like stripping composition to the substrate, a rubbery gum was formed. Steam heat was applied in an attempt to dry the rubbery gum in an attempt to form a laminate, but it was unsuccessful.

Example H illustrates a preferred formula for a slow drying stripping composition useful for penetrating thick coats of difficultly soluble paints. This formula may be permitted to soak for several days if necessary. However, it was found that when used on the average aircraft paint of epoxy resin or polyurethane on aluminum, only 30 minutes were required for soaking after which an application of steam heat accelerated the solvating of the paint and sped the drying of the paint/polymer film laminate. When the steam heat was thereafter pressurized, the laminate could be stripped from the substrate and washed away, with the pressurized steam also rinsing the water soluble solvent from the substrate leaving a surface clean of both paint and stripping composition.

Example I illustrates the use of a different polymer resin than polyvinyl formal resin. Although the polyurethane formed a laminate with the paint which was removable from the substrate, a sticky layer of polyurethane remained on the substrate surface preventing complete removal of the paint. This example demonstrates the fact that although polymers other than polyvinyl formal may lift the paint as well as polyvinyl formal, many may lack the degree of compatibility with the solvent so as to permit the solvent to sweat out of the composition to form a protective release layer of solvent on the substrate surface. This protective release layer of solvent is significant in that it appears to permit the easy removal of the paint/stripping composition laminate in total while allowing for a water wash of the substrate for removal of the solvent.

In Example J the solvent butyrolactone, having a similar solvent parameter and similar boiling point to N-methyl pyrrolidone, is included. Butyrolactone is also water soluble and nontoxic. The resultant stripping composition when applied to the painted substrate created the desired lamination with the paint and exhibited the same characteristics as if the solvent consisted only of N-methyl pyrrolidone. This example illustrates that a solvent having a similar solvent parameter, similar boiling point, and similar compatibility with polyvinyl formal resin can be substituted for N-methyl pyrrolidone with minimum effect. However, it must be remembered that changes in the solvent composition may affect the viscosity of the overall stripping composition.

It also was observed in the above examples where the polymer resin used was polyvinyl formal that the paint film could be peeled and separated from the polymer film of the laminate in all cases where the laminate was permitted to harden, thus permitting separate disposal of the paint if necessary or desired. This might be highly desirable in the event that the paint contains one or more toxic ingredients that would require special disposal considerations.

Thus, a variety of polymers having the right solubility parameter range may be useful in the present invention, although polyvinyl formal is preferred. While all grades of Monsanto FORMVAR (trademark) E 5/95 to E 15/95 are useful in the present invention, FORMVAR trademark) E 15/95, having the highest molecular weight, is preferred. The use of a variety of organic plasticizers is acceptable as long as the plasticizer has the right solubility parameter range with respect to the polymer resin utilized. It was found that the dibasic ester mix used in the examples was an acceptable plasticizer for the short time span needed in the present invention, and exhibited an excellent ability to assist as a paint solvent. Hence, it is the preferred plasticizer.

Finally, any high boiling, water soluble solvent, in the solubility parameter range corresponding to the polyvinyl formal resin and plasticizer would be acceptable. It is preferred to use a low or nontoxic solvent such as N-methyl pyrrolidone or butyrolactone.

Thixotropic and pigmentation additives are desirable optional ingredients. It is recognized that a variety of thixotropic additives and pigmentation additives would be acceptable so long as they do not introduce any adverse effects to the stripping composition.

While particular embodiments of the invention have been described, it will be understood that the invention is not limited thereto since modifications may be made and will become apparent to those skilled in the art.

What is claimed is:

1. A stripping composition useful in removing paint from substrates comprising a mixture of:
    5–40% by weight of polyvinyl formal film forming resin with a Hansen solubility parameter from about 8.5 to about 12.5;
    2–20% by weight of a water insoluble organic plasticizer with a boiling point above 200° C. and a Hansen solubility parameter from about 8.5 to about 12.5; and
    40–90% by weight of a water miscible organic solvent with a boiling point between 150° C. and 300°

C. and a Hansen solubility parameter from about 8.5 to about 12.0.

2. The stripping composition of claim 1 wherein the plasticizer is a dibasic ester selected from the group consisting of dimethyl succinate, dimethyl glutarate, dimethyl adipate and mixtures thereof.

3. The stripping composition of claim 1 wherein the plasticizer is a dibasic ester mixture comprising from about 10% to about 25% by weight dimethyl succinate, from about 45% to about 65% by weight dimethyl glutarate, and from about 20% to about 30% dimethyl adipate.

4. The stripping composition of claim 3 wherein the plasticizer is a dibasic ester mixture consisting of about 23% by weight dimethyl succinate, about 56% by weight dimethyl glutarate, and about 21% by weight dimethyl adipate.

5. The stripping composition of claim 1 wherein the plasticizer is selected from the group consisting of ethylene glycol oxalate copolymer and diethyl phthalate.

6. The stripping composition of claim 1 wherein the plasticizer is a sulfonamide.

7. The stripping composition of claim 2 wherein the solvent is N-methyl pyrrolidone.

8. The stripping composition of claim 1 wherein the solvent is N-methyl pyrrolidone.

9. The stripping composition of claim 8 wherein the solvent has a boiling point of about 202° C. and a Hansen solubility parameter of about 11.

10. The stripping composition of claim 1 wherein the solvent is gamma butyrolactone.

11. The stripping composition of claim 10 wherein the solvent has a boiling point of about 204° C. and a Hansen solubility parameter of about 8.0.

12. The stripping composition of claim 1 wherein the solvent is n-cyclohexyl-2-pyrrolidone.

13. The stripping composition of claim 12 wherein the solvent has a boiling point of about 284° C. and a Hansen solubility parameter of about 8.7.

14. The stripping composition of claim 1 wherein the solvent is N-ethyl-2-pyrrolidone.

15. The stripping composition of claim 14 wherein the solvent has a boiling point of about 200° C. and a Hansen solubility parameter of about 10.3.

16. The stripping composition of claim 1 wherein the solvent is N-hydroxyethyl-2-pyrrolidone.

17. The stripping composition of claim 16 wherein the solvent has a boiling point of about 295° C. and a Hansen solubility parameter of about 11.5.

18. The stripping composition of claim 1 wherein the solvent is N-N-dimethyl-formamide.

19. The stripping composition of claim 18 wherein the solvent has a boiling point of about 153° C. and a Hansen solubility parameter of about 11.0.

20. The stripping composition of claim 1 wherein the solvent is a mixture of two or more of the group consisting of N-methyl-2-pyrrolidone, gamma butyrolactone, N-cyclohexo-2-pyrrolidone, N-ethyl-2-pyrrolidone, N-hydroxyethyl-2-pyrrolidone, and N-N-dimethyl formamide.

21. The stripping composition of claim 1 further comprising 2-6% by weight of a thixotropic additive.

22. The stripping composition of claim 21 wherein the thixotropic additive is colloidal silica.

23. The stripping composition of claim 1 further comprising addition of 1-4% of a pigmentation additive capable of providing visual indication of the composition's thickness when applied to a substrate.

24. The stripping composition of claim 23 wherein the pigmentation additive is titanium dioxide.

25. A stripping composition useful in removing paint from substrates comprising a mixture of:
   15-20% by weight of polyvinyl formal film forming resin with a Hansen solubility parameter from about 8.5 to about 2.5;
   7-9% by weight of a water insoluble organic plasticizer with a boiling point above 200° C. and a Hansen solubility parameter from about 8.5 to about 2.5;
   67-71% by weight of a water miscible organic solvent with a boiling point between 150° C. and 300° C. and a Hansen solubility parameter from about 8.5 to about 12 0.

26. The stripping composition of claim 25 further comprising:
   1.5-2.5% by weight of a pigmentation additive for visually determining approximate thickness of the composition when: applied to a substrate; and
   3-5% by weight of a thixotropic additive for thickening the composition.

27. The stripping composition of claim 26 wherein the plasticizer is a dibasic ester selected from the group consisting of dimethyl succinate, dimethyl glutarate, dimethyl adipate and mixtures thereof; the solvent is N-methyl-pyrrolidone, the pigmentation additive is titanium dioxide, and the thixotropic additive is colloidal silica.

28. The stripping composition of claim 27 wherein the plasticizer is a dibasic ester mixture comprising from about 10% to about 25% by weight dimethyl succinate, from 45% to about 65% by weight dimethyl glutarate, and from 20% to about 30% dimethyl adipate.

29. The stripping composition of claim 28 wherein the plasticizer is a dibasic ester mixture consisting of about 23% by weight dimethyl succinate, about 56% by weight dimethyl glutarate, and about 21% dimethyl adipate.

30. A process for removing paint from a substrate comprising:
   applying to the painted substrate a stripping composition having the formula:
   5-40% by weight of polyvinyl formal film forming resin with a Hansen solubility parameter from about 8.5 to about 12.5;
   2-20% by weight of a water insoluble organic plasticizer with a boiling point above 200° C. and a Hansen solubility parameter from about 8.5 to about 12.5; and
   40-90% by weight of a water miscible organic solvent with a boiling point between 150° C. and 300° C. and a Hansen solubility parameter from about 8.5 to about 12.0;
   allowing the stripping composition to form a laminate with the paint;
   removing the resultant laminate from the substrate.

31. The process of claim 30 wherein the solvent is selected from the group consisting of N-ethyl pyrrolidone, N-N-dimethyl formamide, gamma outyrolactone, N-cyclohexyl-2-pyrrolidone, N-ethyl-2-pyrrolidone, and N-hydroxyethyl-2-pyrrolidone.

32. The process of claim 31 wherein the plasticizer is a dibasic ester selected from the group consisting of dimethyl succinate, dimethyl glutarate, dimethyl adipate, and mixtures thereof.

33. The process of claim 31 wherein the plasticizer is selected from the group consisting of ethylene glycol oxalate copolymer and diethyl phthalate.

34. The process of claim 31 wherein the plasticizer is a sulfonamide.

35. A process for removing paint from a substrate comprising:
   applying to the painted substrate a stripping composition having the formula:
   5-40% by weight of polyvinyl formal film forming resin with a Hansen solubility parameter from about 8.5 to 12.5;
   2-20% by weight of a water insoluble organic plasticizer selected from the group consisting of (1) dimethyl succinate, dimethyl glutarate, dimethyl adipate, and mixtures thereof, (2) ethylene glycol oxalate copolymer, and (3) sulfonamide, wherein said plasticizer has a boiling point above 200° C. and a Hansen solubility parameter from about 8.5 to about 12.5;
   40-90% by Weight of a water miscible organic solvent having a Hansen solubility parameter from about 8.5 to about 12.0 selected from the group consisting of N-methyl-pyrrolidone, gamma butyrolactone, N-cyclohexo-2-pyrrolidone, N-ethyl-,2pyrrolidone, N-hydroxyethyl-2-pyrrolidone and N-N-dimethyl formamide and mixtures thereof;
   allowing the stripping composition to form a laminate with the paint; and
   removing the resultant laminate from the substrate.

36. A process for removing paint from a substrate in accordance with claim 35 further comprising heating the applied stripping composition thereby accelerating the lamination step.

37. The process for removing paint from a substrate in accordance with claim 36 wherein the applied stripping composition is heated by steam.

38. The process for removing paint from a substrate in accordance with claim 36 wherein; the applied stripping composition is heated by hot water.

39. The process for removing paint from a substrate in accordance with claim 36 wherein the applied stripping composition is heated by hot air.

40. The process for removing paint from a substrate in accordance with claim 30 wherein the resultant laminate is removed by high pressure water.

41. The process for removing paint from a substrate in accordance with claim 30 wherein the resultant laminate is removed by high pressure steam.

* * * * *

UNITED STATES PATENT AND TRADEMARK OFFICE
CERTIFICATE OF CORRECTION

PATENT NO. : 5,030,290
DATED      : July 9, 1991
INVENTOR(S) : Davis, Elbert

It is certified that error appears in the above-identified patent and that said Letters Patent is hereby corrected as shown below:

Column 10, line 11, "2.5" should be --12.5--.

Signed and Sealed this

Tenth Day of November, 1992

Attest:

DOUGLAS B. COMER

*Attesting Officer*     Acting Commissioner of Patents and Trademarks